US011401884B2

(12) United States Patent
Chambers et al.

(10) Patent No.: US 11,401,884 B2
(45) Date of Patent: Aug. 2, 2022

(54) METHODS AND SYSTEMS FOR CONTROLLING A FUELING STRATEGY FOR INTERNAL COMBUSTION ENGINES

(71) Applicant: Caterpillar Inc., Peoria, IL (US)

(72) Inventors: Joseph G. Chambers, Edwards, IL (US); Derek A. Tanis, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 22 days.

(21) Appl. No.: 16/825,745

(22) Filed: Mar. 20, 2020

(65) Prior Publication Data
US 2021/0293199 A1 Sep. 23, 2021

(51) Int. Cl.
*F02D 41/40* (2006.01)

(52) U.S. Cl.
CPC ......... *F02D 41/401* (2013.01); *F02D 41/403* (2013.01); *F02D 41/405* (2013.01); *F02D 2200/0406* (2013.01); *F02D 2200/0414* (2013.01); *F02D 2200/101* (2013.01)

(58) Field of Classification Search
CPC .... F02D 41/401; F02D 41/403; F02D 41/405; F02D 2200/0406; F02D 2200/101; F02D 2200/0414
See application file for complete search history.

(56) References Cited

U.S. PATENT DOCUMENTS

| 3,927,652 | A | * | 12/1975 | O'Neill | F02D 41/2096 |
| | | | | | 123/294 |
| 6,390,058 | B1 | * | 5/2002 | Takahashi | F02D 41/403 |
| | | | | | 123/299 |
| 6,467,452 | B1 | * | 10/2002 | Duffy | F02D 41/402 |
| | | | | | 123/299 |
| 6,681,740 | B1 | * | 1/2004 | Majewski | F02B 23/0672 |
| | | | | | 123/320 |
| 6,868,831 | B2 | * | 3/2005 | Lei | F02M 59/466 |
| | | | | | 123/467 |
| 7,707,993 | B2 | * | 5/2010 | Coldren | F02M 57/021 |
| | | | | | 123/473 |
| 9,458,773 | B2 | * | 10/2016 | Glugla | F02D 19/0692 |
| 9,765,742 | B2 | * | 9/2017 | Cueto | F02M 65/001 |
| 9,863,359 | B2 | | 1/2018 | Melis et al. | |
| 2016/0061128 | A1 | * | 3/2016 | Nicholson | F02D 41/0007 |
| | | | | | 60/274 |
| 2016/0090936 | A1 | * | 3/2016 | Melis | F02D 41/247 |
| | | | | | 701/105 |
| 2017/0101949 | A1 | | 4/2017 | Yokono et al. | |
| 2018/0313282 | A1 | | 11/2018 | Pati et al. | |
| 2019/0085776 | A1 | * | 3/2019 | Tate, Jr. | F02D 19/081 |

FOREIGN PATENT DOCUMENTS

| JP | 2020002863 | 6/2018 |
| KR | 20090063887 | 12/2007 |

* cited by examiner

*Primary Examiner* — Sizo B Vilakazi
(74) *Attorney, Agent, or Firm* — Bookoff McAndrews PLLC

(57) ABSTRACT

A method for controlling fuel injection aspects of a fuel system of an internal combustion engine includes determining a fuel injection strategy for each engine cycle including a pilot fuel injection, a main fuel injection, and a dwell time between the pilot and main fuel injections. The method also includes automatically adjusting the dwell time for each engine cycle based on a sensed ambient temperature and ambient pressure associated with the internal combustion engine.

20 Claims, 4 Drawing Sheets

METHODS AND SYSTEMS FOR CONTROLLING A FUELING STRATEGY FOR INTERNAL COMBUSTION ENGINES

TECHNICAL FIELD

The present disclosure relates generally to internal combustion engines, and more particularly, to methods and systems for determining dwell times for fueling strategies of internal combustion engines.

BACKGROUND

Many internal combustion engines include electronic control units that monitor and operate aspects of the operation of the engine, including the timing and quantity of fuel injection. Engine control units perform these operations with the use of a series of maps, or other programming, stored in memory of the control unit. In conjunction with these maps or programs, the engine control units receive and calculate various items of feedback representative of the operation of the engine. Moreover, the engine control units may perform fuel injection strategies that provide multiple fuel injections with one or more dwell times between the multiple fuel injections during an injection cycle of the engine to achieve desired engine performance and to meet emissions requirements. However, changes in engine characteristics due to various environmental conditions, for example, high altitudes and low ambient temperatures, may cause multiple fuel injections to merge and act as one fuel injection event. Such fuel injection events may lead to erratic, uncontrolled, and undesired engine performance.

U.S. Pat. No. 9,863,359, issued to Melis et al. on Jan. 9, 2018 ("the '359 patent"), describes a method of controlling a dwell time between two injections of a fuel injector. The method described in the '359 patent involves determining the dwell time by adjusting the time difference between a fuel command signal received by the fuel injector and the actual response time of the fuel injector by subtracting the dwell time with a correction value. However, the method of the '359 patent is not disclosed as determining a dwell time based on changes in engine characteristics due to varying environmental conditions.

The disclosed methods and systems may solve one or more of the problems set forth above and/or other problems in the art. The scope of the current disclosure, however, is defined by the attached claims, and not by the ability to solve any specific problem.

SUMMARY

In one aspect, a method for controlling fuel injection aspects of a fuel system of an internal combustion engine may include determining a fuel injection strategy for each engine cycle including a pilot fuel injection, a main fuel injection, and a dwell time between the pilot and main fuel injections. The method may also include automatically adjusting the dwell time for each engine cycle based on a sensed ambient temperature and ambient pressure associated with the internal combustion engine.

In another aspect, a fuel system for an internal combustion engine may include a plurality of fuel injectors supplying fuel to a plurality of combustion chambers, an intake manifold providing air to the combustion chambers, and a controller. The controller may be configured to determine a fuel injection strategy for each engine cycle including a pilot fuel injection, a main fuel injection, and a dwell time between the pilot and main fuel injections. The controller may be further configured to automatically adjust the dwell time for each engine cycle based on a sensed ambient temperature and ambient pressure associated with the internal combustion engine.

In yet another aspect, a non-transitory computer-readable medium may store instructions that, when executed by one or more processors of a computer system, cause the one or more processors to perform a method for controlling fuel injection aspects of a fuel system of an internal combustion engine. The method may include determining a fuel injection strategy for each engine cycle including a pilot fuel injection, a main fuel injection, and a dwell time between the pilot and main fuel injections. The method may also include automatically adjusting the dwell time for each engine cycle based on a sensed ambient temperature and ambient pressure associated with the internal combustion engine.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
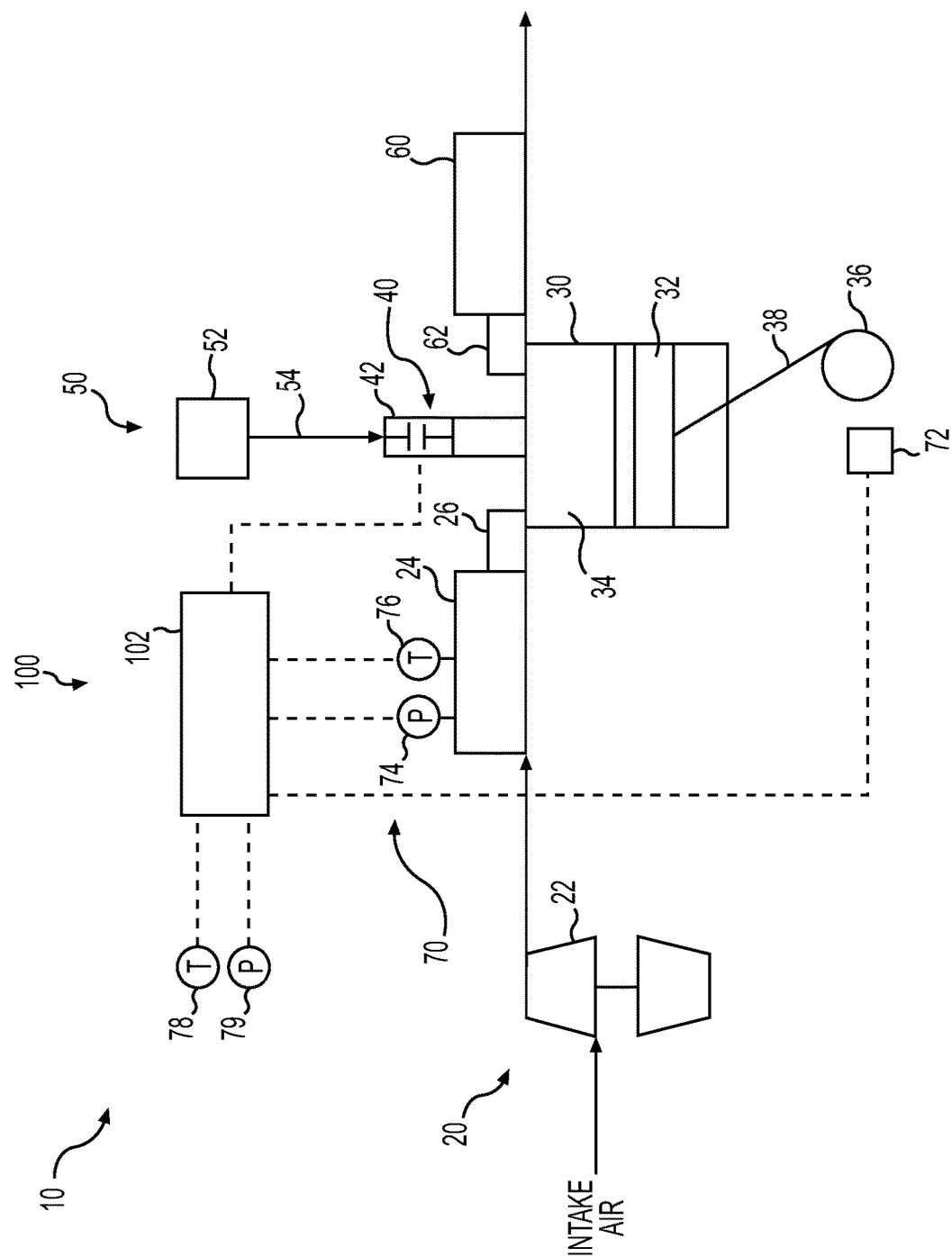
FIG. 1 is a schematic view of an internal combustion engine system, according to aspects of the disclosure.

FIG. 1 illustrates a schematic view of an internal combustion engine system 10 having an engine control system 100 according to an aspect of the present disclosure. Internal combustion engine system 10 may include an air intake system 20 and a fuel system 50. Internal combustion engine system 10 may also include an exhaust system 60 and a plurality of engine cylinders 30 (a single engine cylinder 30 is depicted in FIG. 1). Internal combustion engine system 10 may provide fuel to engine cylinders 30 from fuel system 50, and air intake system 20 may deliver intake air to engine cylinders 30. Air intake system 20 may include an intake manifold 24. Intake manifold 24 may supply intake air to engine cylinders 30. Air intake system 20 may also include a turbocharger 22. Turbocharger 22 may include a compressor for compressing intake air. It is understood that air intake system 20 may include any number and/or combination of valves or other components, as is known in the art.

Each engine cylinder 30 may include a piston 32 slidably and reciprocally disposed to form a combustion chamber 34 of the cylinder 30. Piston 32 of each cylinder 30 may be connected to a crankshaft 36 via a connecting rod 38 and may provide power to components that are driven by internal combustion engine system 10. Engine cylinders 30 may also include one or more intake air ports 26 for providing air (e.g., intake air) to combustion chamber 34. Cylinder 30 may also include one or more exhaust ports 62 for exhausting combustion gases from cylinder 30 to exhaust system 60. The exhaust system 60 may include an after treatment system (not shown).

As shown in FIG. 1, each cylinder 30 may be coupled to a fuel injector 40 that injects fuel received from fuel system 50 to combustion chamber 34. Fuel injector 40 may be any type of fuel injector that enables control of the fuel injection quantity and timing. Fuel system 50 may include a fuel supply 52, such as a fuel tank, a fuel pump, a common fuel rail, and a fuel supply line 54. Fuel system 50 may be configured to use various types of fuel, such as diesel, gasoline, methanol, ethanol, or any other type of fuel. Fuel injector 40 may include an injector controller 42, such as an electronically-controlled valve or other device for controlling the timing and duration of fuel injected from fuel injector 40. Injector controller 42, for example, may be an electronic control unit within the fuel injector 40 that controls actuation of the fuel injector 40, or may include a fuel injector solenoid (e.g., a fuel injector solenoid that may receive fuel signals) and an associated valve of fuel injector 40 that is moved by actuation of the fuel injector solenoid to control fuel injection through fuel injector 40.

Engine control system 100 may include a controller 102, such as an engine control module (ECM) that may be configured to receive a desired engine speed request and actual engine operating conditions, and output fuel command signals to selectively energize and operate injector controller 42 of fuel injector 40. Controller 102 may be configured to receive sensor signals from various sensors of a sensor system 70 associate with actual engine operating conditions. Such sensors may include, but are not limited to, an engine speed sensor 72, an intake manifold pressure sensor 74, an intake manifold temperature sensor 76, an ambient temperature sensor 78, and an ambient pressure sensor 79. Engine speed sensor 72 may be any suitable engine speed sensor, such as one or more hall-effect sensors. In one aspect, engine speed sensor 72 may be configured to output engine speed signal 110 indicative of a speed of rotation of crankshaft 36. Engine speed sensor 72 may, if desired, measure rotation of one or more other locations indicative of a speed of internal combustion engine system 10 (e.g., a pulley, flywheel, camshaft, etc.). Intake manifold pressure sensor 74 may be located inside intake manifold 24 to sense the pressure inside intake manifold 24, and intake manifold temperature sensor 76 may be located inside intake manifold 24 to sense the temperature inside intake manifold 24. Ambient temperature sensor 78 and ambient pressure sensor 79 may be of any conventional design, and be located inside or outside of system 10 to detect ambient temperature and pressure of operating environmental conditions of system 10 (e.g., ambient temperature and barometric pressure). Further, sensor system 70 may include any number and/or combination of sensors as necessary. In FIG. 1, solid lines represent fluid passages, while dashed lines represent electrical communication lines or conductors.

Figure 2:
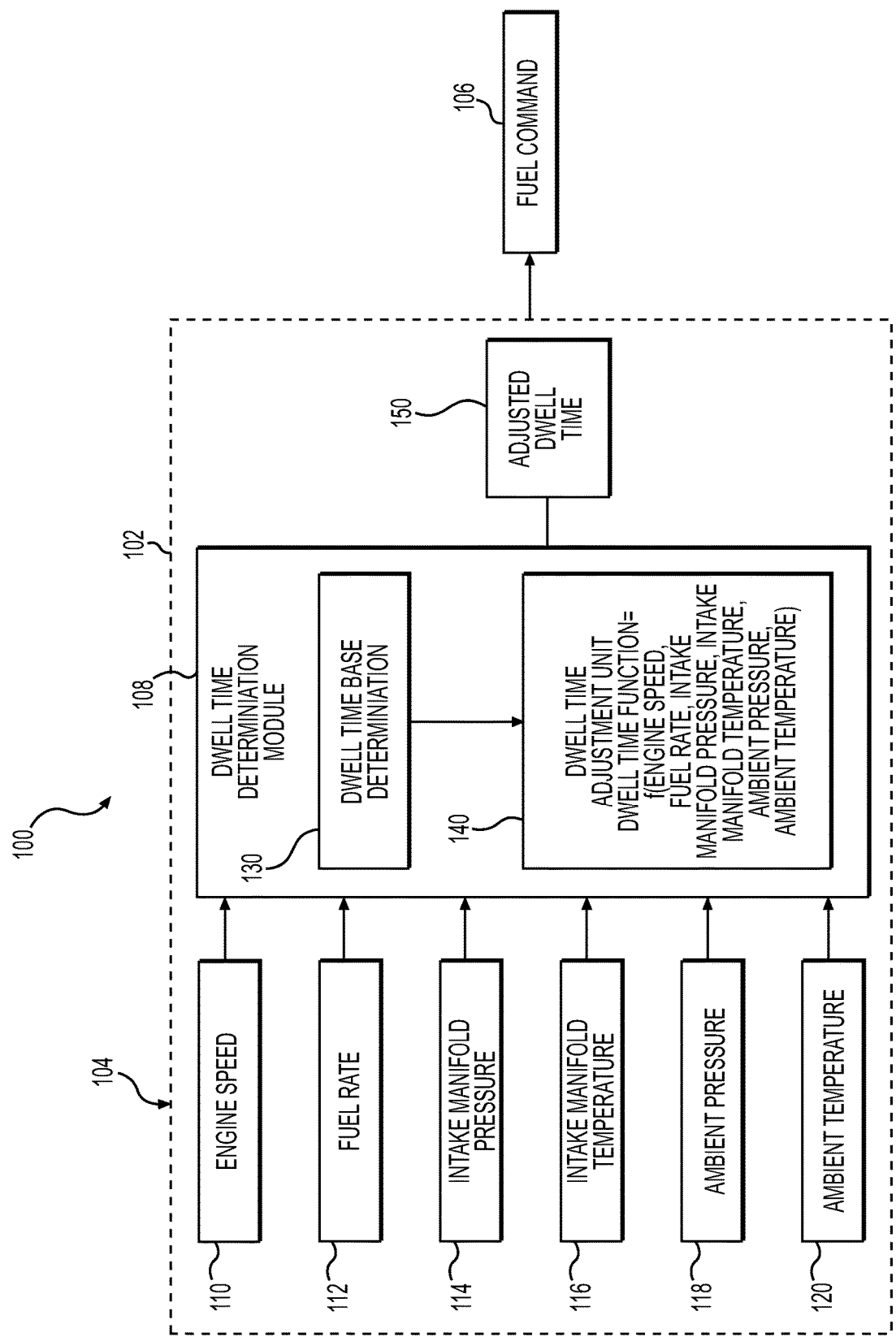
FIG. 2 is a schematic view of an exemplary engine control system for the internal combustion engine system of FIG. 1.

FIG. 2 illustrates a schematic view of engine control system 100 for operation and/or control of at least portions of internal combustion engine system 10. Engine control system 100 may include inputs 104, controller 102, and a fuel command 106. Controller 102 may also include a memory, a secondary storage device, and a processor, such as a central processing unit or any other means for accomplishing a task consistent with the present disclosure. The memory or secondary storage device associated with controller 102 may include non-transitory computer-readable media and may store data and/or software routines that assist controller 102 in performing its functions, such as the functions of method 300 of FIG. 3. Further, the memory or secondary storage device associated with controller 102 may also store data received from various inputs 104 associated with engine control system 100. Numerous commercially available microprocessors can be configured to perform the functions of controller 102. It should be appreciated that controller 102 could readily embody a general machine controller capable of controlling numerous other machine functions. Various other known circuits may be associated with controller 102, including signal-conditioning circuitry, communication circuitry, hydraulic or other actuation circuitry, and other appropriate circuitry.

Controller 102 may also include a variety of different maps and/or lookup tables (not shown) stored within the memory of controller 102 including maps and/or tables relating to engine speed, engine load, the fuel pressure, desired total fuel quantity, and other parameters. With these maps and various inputs such as a desired engine speed request, controller 102 may be able to dynamically determine a fuel injection strategy to achieve a desired engine performance. Such a fuel injection strategy (implemented at least in part by fuel command 106) may include, for example, an appropriate number of fuel shots, a quantity of fuel required for each fuel shot, the timing and duration of each individual shot, and a dwell time between fuel shots. While the discussion in this disclosure will focus on a fuel injection strategy including a pilot fuel shot, a dwell time, and a main fuel shot, it is understood that this disclosure can be used for other fuel injection strategies, such as those including various fuel injection shots, and their associated dwell times, either singly or in combination. For example, in one aspect, a fuel injection strategy may include fuel injection parameters for pilot, main, and post injections and their associated dwell times. In another aspect, a fuel injection strategy may include fuel injection parameters for just main and post injection shots, and the dwell time therebetween.

As part of the determination of the fuel injection strategy to achieve the desired engine performance, controller 102 may include a dwell time determination module 108. Dwell time determination module 108 may receive inputs 104 and implement aspects of method 300 for determining a dwell time using a dwell time function. Inputs 104 may include, for example, measured actual engine operating parameters, such as an engine speed 110 received from engine speed sensor 72, a fuel rate 112, an engine intake manifold air pressure 114 received from intake manifold pressure sensor 74, an engine intake manifold air temperature 116 received from intake manifold temperature sensor 76, an ambient temperature 120 received from ambient temperature sensor 78, and an ambient pressure 118 received from ambient pressure sensor 79. Fuel rate 112 may be calculated based on an injector duration (e.g., "on time" of fuel injector 40) and engine speed 110, as is known in the art. Fuel injection maps or look up tables may be made based on a predetermined correlation between fuel injector 40 duration to physical quantity of fuel delivery. Additionally, two constants, for example, the total number of fuel injectors 40 and a predetermined diesel fuel density, may be used, in combination with the above-described predetermined correlation mapping, to calculate fuel rate 112 (e.g., a mass flow rate of fuel).

In one aspect, dwell time determination module 108 may include a dwell time base determination unit or module 130 that uses various stored maps and/or lookup tables in controller 102 to determine a base dwell time between a pilot fuel shot and a main fuel shot. The base dwell time determination may be determined using the maps and/or lookup tables and various inputs, engine parameters, and constraints, as is known in the art.

The controller 102, and in particular the dwell time determination module 108, may also include a dwell time adjustment unit or module 140 configured to adjust the base dwell time determined by the dwell time based determination unit 130. The dwell time adjustment unit 140 uses a dwell time function to determine a dwell time adjustment to be applied to the base dwell time. The dwell time function is represented as follows:

Dwell Time Adjustment=f (Engine Speed, Fuel Rate, Intake Manifold Pressure, Intake Manifold Temperature, Ambient Pressure, Ambient Temperature)

Figure 4:
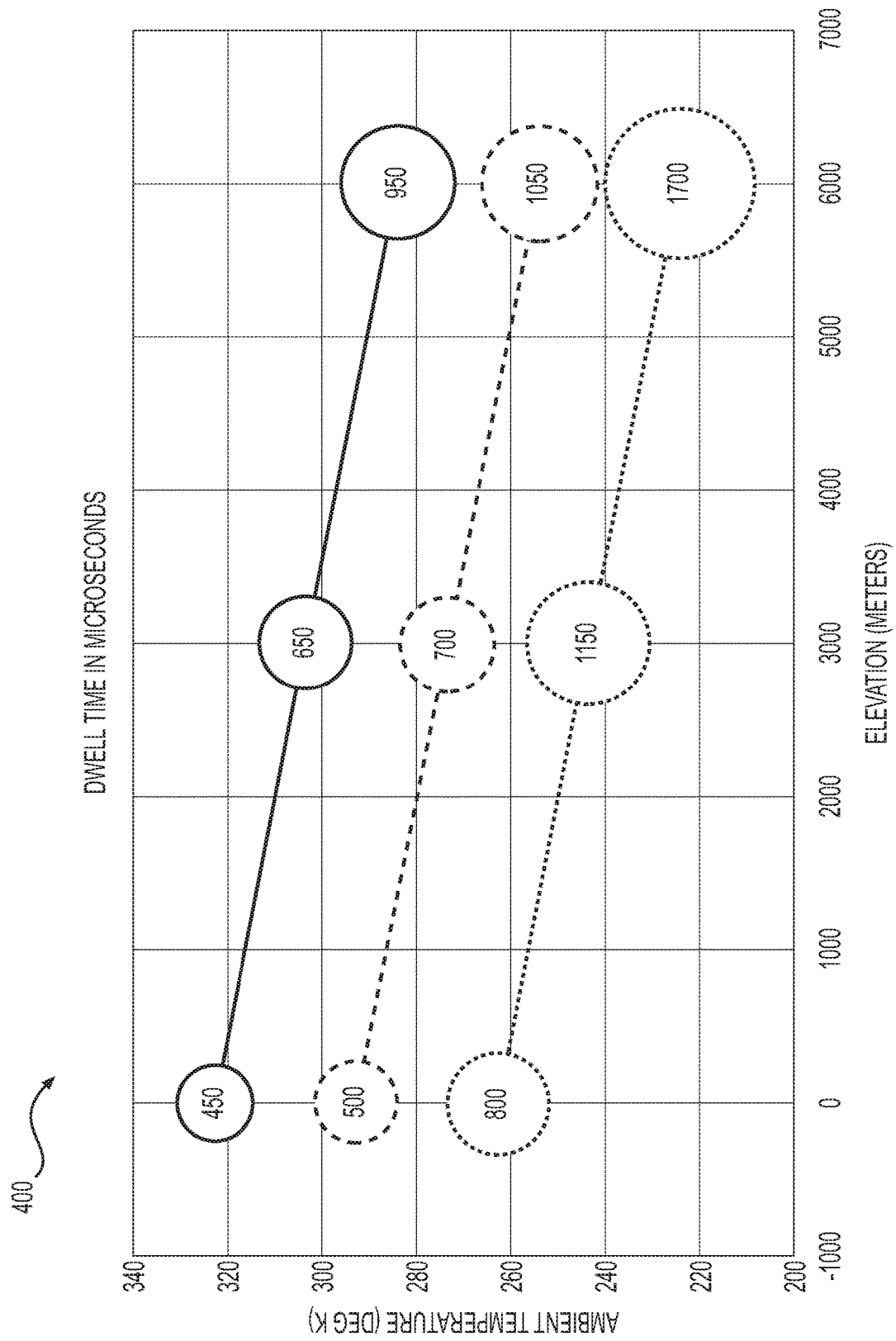
FIG. 4 includes a chart of adjusted dwell time values in accordance with a dwell time function disclosed herein.

Dwell time adjustment unit 140 may automatically adjust the base dwell time to account for ambient temperature and pressure variations detected by ambient temperature sensor 78 and ambient pressure sensor 79. For example, dwell time adjustment unit 140 may act to increase a base dwell time when an ambient pressure 118 decreases—corresponding to an increase in altitude, or the dwell time may increase when ambient temperature 120 decreases. FIG. 4 illustrates examples of the effect of the dwell time adjustment between a pilot and main fuel shot at a single speed and fueling that has been calibrated to 500 microseconds. As shown, the dwell time adjustment function provides for an increase from 500 to 800 microseconds when the temperature decreases from approximately 290 K to approximately 260K, and the dwell time increases from 500 to 700 microseconds as the ambient pressure decreases corresponding to an increased altitude from 0 to 3000 meters. In another example, if the ambient temperature and ambient pressure of the current operating condition of system both increase, dwell time adjustment unit 140 may decrease the adjustment of the base dwell time. As such, the dwell time may be adjusted to increase or decrease according to the dwell time function and inputs 104. The adjusted dwell time values described above are exemplary values only and are not restrictive of the dwell time determination.

As noted in the function expressed above, the dwell time adjustment unit 140 determines a dwell time adjustment based on a current engine speed signal 110, fuel rate 112, intake manifold pressure signal 114, intake manifold temperature signal 116, ambient pressure signal 118, and ambient temperature signal 120. More or less inputs may be used in the function to achieve the same desired relationship between dwell time, ambient pressure, and ambient temperature.

Referring back to FIG. 2, dwell time determination module 108 may take the determined base dwell time (from dwell time based determination unit 130) and the dwell time adjustment (from dwell time adjustment unit 140) and determine an adjusted dwell time 150. This adjusted dwell time 150 between multiple injections (e.g., pilot injection and main injection) may then be used in determining the fuel command 106 delivered to the fuel injectors 40.

In one aspect, controller 102 may determine fuel command 106 based in part on the adjusted dwell time 150 output by dwell time determination module 108. Controller 102 may use various other engine/machine parameters and stored information to determine one or more fuel command signals 106 to be sent to each fuel injector 40. Fuel command 106 may provide a timing and duration for opening the valves of the fuel injector. Fuel command 106 may include, for example, one or more signals to control a duration and timing of a fuel injection event based on a dwell time (e.g., fuel provided to or injected by fuel injectors 40 by opening or closing fuel injector 40 via injector controller 42) and/or a number of fuel injections. As noted above, injector controller 42 may include an electronically-controlled valve, such as a solenoid valve controlling the supply of high pressure fuel to a nozzle of the injector, or other device for controlling the output of fuel injector 40. Fuel command 106 may also include, for example, one or more control signals to control a plurality of electronically-controllable components of internal combustion engine system 10 based on one or more such requests, either directly or by one or more intermediate controllers.

INDUSTRIAL APPLICABILITY

The disclosed aspects of engine control system 100 of the present disclosure may be used in any internal combustion engine system. In particular, engine control system 100 may be used in any internal combustion engine system in which it may be desirable to determine a timing at which a fuel injector of an internal combustion engine provides multiple fuel injections during an engine cycle.

During an operation of internal combustion engine system 10, fuel system 50 may direct fuel into combustion chamber 34 of cylinder 30. Each fuel injector 40 may inject fuel during one or more injection events or shots. For example, fuel injector 40 may be configured to inject fuel once, twice, or three times during a single cycle of the engine with dwell times between the one or more injection events. A largest amount of fuel, as measured in fuel mass, may be injected during a main injection or main shot. One or more smaller injection events may occur before or after the main injection. An injection that occurs before the main injection may form a pilot injection or pilot shot of fuel, while an injection that occurs after the main injection may form a post injection or post shot of fuel. Engine control system 100 may, while internal combustion engine system 10 is operating, continuously monitor the operation of fuel injector 40 and adjust the timing of the pilot, main, and/or post injections. Moreover, engine control system 100 may adjust the timing of the pilot, main, and/or post injections by calculating and adjusting dwell times based on sensed information by sensor system 70 (e.g., engine speed, fuel rate, intake manifold pressure, intake manifold temperature, ambient temperature, ambient/barometric pressure, etc.) so as prevent erratic, uncontrolled, and undesired injection events (e.g., pilot, main, and/or post injections being merged into a single injection).

Figure 3:
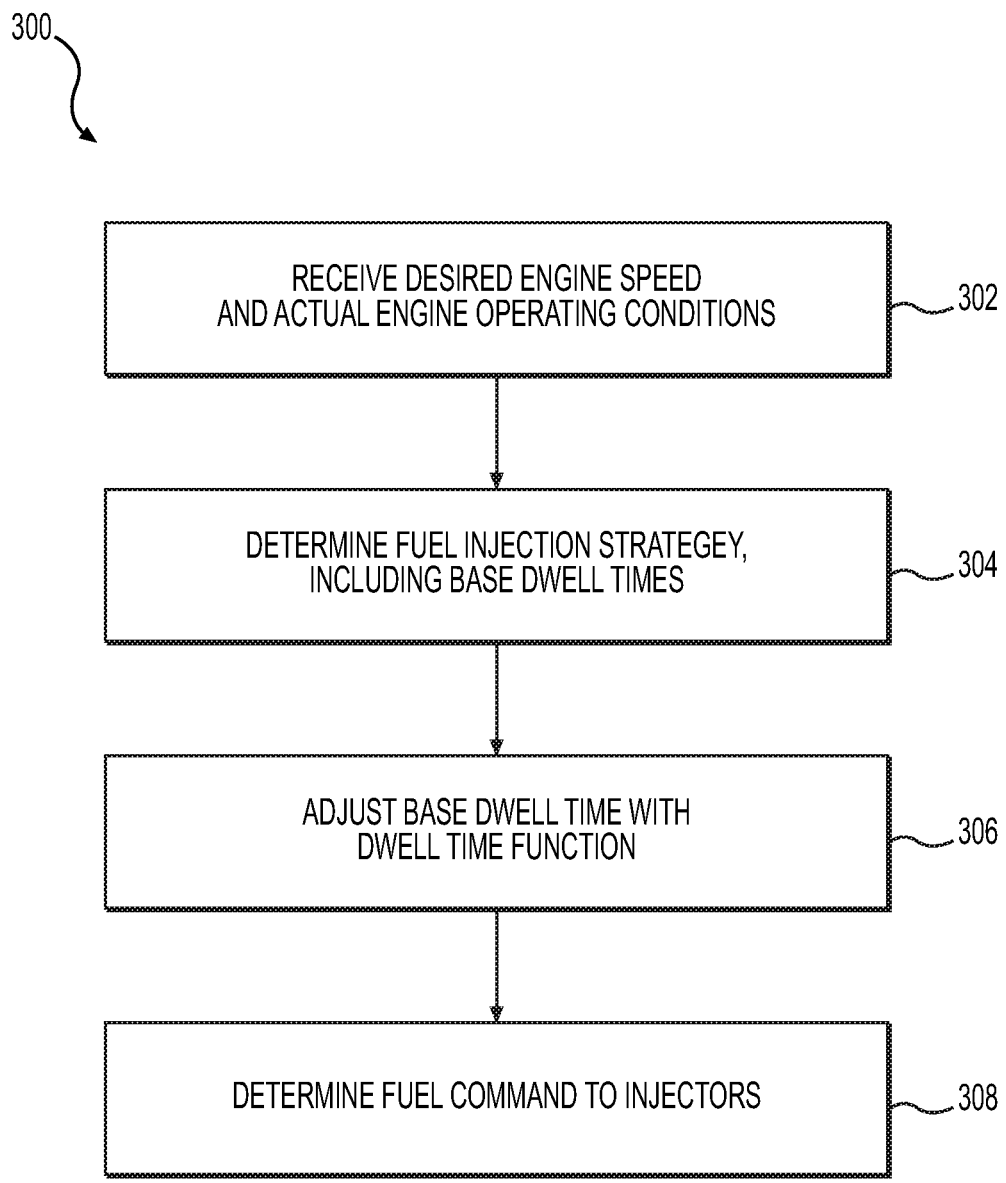
FIG. 3 provides a flowchart depicting an exemplary method for determining fuel injection aspects for the internal combustion engine system of FIG. 1.

FIG. 3 illustrates a flowchart depicting an exemplary method 300 for determining fuel injection aspects of a fuel system of an internal combustion engine. In step 302, controller 102 may receive a desired engine speed signal, for example, from an operator of a machine associated with engine system 10, and also receive actual engine operating conditions such as data corresponding to engine speed 110, fuel rate 112, intake manifold pressure 114, intake manifold temperature 116, ambient pressure 118, and ambient temperature 120. The engine fuel rate data may be be received or derived as explained above. The engine speed data may be based on engine speed 110 from engine speed sensor 72. Further, the engine intake-side air pressure data may be based on intake manifold pressure 114 from intake manifold pressure sensor 74 inside intake manifold 24, and the engine intake-side air temperature data may be based on intake manifold temperature 116 from intake manifold temperature sensor 76 inside intake manifold 24. Ambient pressure and temperature data may be received from ambient pressure and temperature sensors 79, 78, respectively.

In step 304, controller 102 may determine a fuel injection strategy to achieve a desired engine performance, with such a fuel strategy including, for example, the number of fuel injections or shots for the engine cycle, and base dwell time determinations via dwell time base determination unit or module 130. As noted above, the controller 102 may use various inputs and maps or lookup tables to determine the appropriate fuel strategy. Such a fuel strategy may include a pilot and main fuel shot and a pilot-to-main dwell time for a fuel injector command 106.

The determined base dwell time or times of the fuel injection strategy from step 304 may then be adjusted in step 306. The adjustment of the base dwell time(s) may be achieved through the dwell time adjustment unit 140, and in particular, the dwell time adjustment function discussed above. As noted above, the dwell time adjustment function may be based at least on the engine speed data, fueling data, engine intake-side air pressure data, engine intake-side air temperature data, and ambient temperature and pressure data. Dwell time adjustment unit 140 may account for density variations based on ambient temperature and pressure changes. The determined dwell time adjustment can then be applied to the base dwell time(s) to determine an adjusted dwell time or times 150. In step 308, the adjusted dwell time or times 150 may be used in determining the fuel command 106 to send to the fuel injectors 40.

By using the various inputs and sensors to detect changing environmental conditions and applying the dwell time function of the present disclosure, the dwell time between multiple fuel injections of internal combustion engine system 10 may be adjusted to allow precise operation of system 10 in various operating conditions such as extreme environmental conditions. Moreover, the dwell time function may allow for controller 102 to modify injection timings by adjusting the dwell function between multiple injections with increased precision and help prevent unintended merging of multiple injections (e.g., merging of pilot and main injections) into a single injection in certain environmental conditions. This improved control may improve engine performance, reduce emissions of pollutants, reduce noise, and improve the durability of the engine.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method for controlling fuel injection aspects of a fuel system of an internal combustion engine, comprising:
   determining a fuel injection strategy for each engine cycle including a pilot fuel injection, a main fuel injection, and a dwell time between the pilot and main fuel injections; and
   automatically adjusting the dwell time for each engine cycle based on a sensed ambient temperature and ambient pressure associated with the internal combustion engine such that the dwell time increases when the sensed ambient temperature decreases and when the sensed ambient pressure decreases.

2. The method of claim 1, wherein adjusting the dwell time includes calculating a dwell time adjustment based on a function relating at least engine fueling data, engine speed data, the sensed ambient pressure, and the sensed ambient temperature.

3. The method of claim 2, wherein the function further relates engine intake-side air pressure data and engine intake-side air temperature data.

4. The method of claim 3, wherein the engine intake-side air pressure data is based on an intake manifold pressure of the engine.

5. The method of claim 4, wherein the engine intake-side air temperature data is based on an intake manifold temperature of the engine.

6. A fuel system for an internal combustion engine, comprising:
   a plurality of fuel injectors configured to supply fuel to a plurality of combustion chambers;
   an intake manifold configured to provide air to the combustion chambers; and
   a controller configured to:
      determine a fuel injection strategy for each engine cycle including a pilot fuel injection, a main fuel injection, and a dwell time between the pilot and main fuel injections; and
      automatically adjust the dwell time for each engine cycle based on a sensed temperature and pressure associated with the internal combustion engine such that the dwell time increases when the sensed temperature decreases and when the sensed pressure decreases.

7. The system of claim 6, wherein adjusting the dwell time includes calculating a dwell time adjustment based on a function relating at least engine fueling data, engine speed data, the sensed pressure, and the sensed temperature.

8. The system of claim 7, wherein the function further relates engine intake-side air pressure data and engine intake-side air temperature data.

9. The system of claim 8, wherein the engine intake-side air pressure data is based on an intake manifold pressure of the engine.

10. The system of claim 9, wherein the engine intake-side air temperature data is based on an intake manifold temperature of the engine.

11. A non-transitory computer-readable medium storing instructions that, when executed by one or more processors of a computer system, cause the one or more processors to perform a method for controlling fuel injection aspects of a fuel system of an internal combustion engine, the method comprising:
   determining a fuel injection strategy for each engine cycle including a pilot fuel injection, a main fuel injection, and a dwell time between the pilot and main fuel injections; and
   automatically adjusting the dwell time for each engine cycle based on a sensed ambient temperature and ambient pressure associated with the internal combustion engine such that the dwell time increases when the sensed ambient temperature decreases and when the sensed ambient pressure decreases to prevent merging of the pilot fuel injection and the main fuel injection.

12. The medium of claim 11, wherein adjusting the dwell time includes calculating a dwell time adjustment based on a function relating at least engine fueling data, engine speed data, the sensed ambient pressure, and the sensed ambient temperature.

13. The method of claim 1, wherein the fuel injection strategy includes a post fuel injection and a dwell time between the main and post fuel injections.

14. The method of claim 13, further including automatically adjusting the dwell time between the main and post fuel injections for each engine cycle based on the sensed ambient temperature and the sensed ambient pressure.

15. The system of claim 6, wherein the sensed temperature is an intake air temperature.

16. The system of claim 6, wherein the sensed temperature is an ambient temperature.

17. The system of claim 6, wherein the sensed pressure is an intake air pressure.

18. The system of claim 6, wherein the sensed pressure is an ambient pressure.

19. The system of claim 6, wherein the adjustment to the dwell time prevents merging of the pilot fuel injection and the main fuel injection.

20. The medium of claim 11, wherein the method further includes automatically adjusting the dwell time between the main fuel injection and a post fuel injection for each engine cycle based on the sensed ambient temperature and the sensed ambient pressure.

* * * * *